(12) United States Patent
Yang

(10) Patent No.: US 11,994,912 B2
(45) Date of Patent: May 28, 2024

(54) DAMPING MECHANISM, HINGE AND FOLDING ELECTRONIC DEVICE

(71) Applicant: BEIJING XIAOMI MOBILE SOFTWARE CO., LTD., Beijing (CN)

(72) Inventor: Jieming Yang, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 120 days.

(21) Appl. No.: 17/588,259

(22) Filed: Jan. 29, 2022

(65) Prior Publication Data

US 2023/0134121 A1    May 4, 2023

(30) Foreign Application Priority Data

Oct. 29, 2021    (CN) .......................... 202111275802.X

(51) Int. Cl.
*G06F 1/16* (2006.01)
*F16F 9/14* (2006.01)

(52) U.S. Cl.
CPC ............ *G06F 1/1652* (2013.01); *F16F 9/145* (2013.01)

(58) Field of Classification Search
CPC ........ G06F 1/1652; F16F 9/145; E05D 11/08; E05D 3/06
See application file for complete search history.

(56) References Cited

U.S. PATENT DOCUMENTS

| | | | |
|---|---|---|---|
| 9,409,588 B2* | 8/2016 | Sintorn | ..................... B62D 1/02 |
| 10,447,829 B2* | 10/2019 | Lin | ..................... H04M 1/021 |
| 10,961,761 B2* | 3/2021 | Vos | ......................... E05F 3/104 |
| 11,619,978 B2* | 4/2023 | Jan | ......................... G06F 1/1681 |
| | | | 361/679.27 |
| 11,698,665 B2* | 7/2023 | Hsu | ....................... G06F 1/1681 |
| | | | 16/233 |
| 2002/0157909 A1* | 10/2002 | Hasegawa | ............... F16F 9/125 |
| | | | 188/290 |
| 2014/0249720 A1* | 9/2014 | Sintorn | .................... F16F 9/125 |
| | | | 701/41 |
| 2015/0327383 A1* | 11/2015 | Hsu | ....................... G06F 1/1616 |
| | | | 16/366 |
| 2019/0191021 A1* | 6/2019 | Lin | ........................... E05D 3/12 |
| 2020/0408019 A1* | 12/2020 | Vos | ......................... E05F 3/104 |
| 2021/0271294 A1* | 9/2021 | Liao | ......................... G06F 1/181 |
| 2021/0382527 A1* | 12/2021 | Cheng | .................... G06F 1/1616 |
| 2022/0235594 A1* | 7/2022 | Laws | ....................... E06B 11/02 |

FOREIGN PATENT DOCUMENTS

EP    2518252 A2    10/2012

OTHER PUBLICATIONS

European Patent Application No. 22153764.0, Search and Opinion dated Jul. 20, 2022, 7 pages.

* cited by examiner

*Primary Examiner* — Thomas W Irvin
(74) *Attorney, Agent, or Firm* — COZEN O'CONNOR

(57) ABSTRACT

A damping mechanism includes a chamber, a movable blocking member and a power assembly. At least part of the movable blocking member is located in the chamber and cooperates with an inner wall face of the chamber to encloses a damping fluid cavity; at least one of the chamber and the movable blocking member defines a damping fluid circulation port in communication with the damping fluid cavity; and the power assembly is abutted against the movable blocking member, and configured to drive the movable blocking member to move relative to the chamber to change volume of the damping fluid cavity.

17 Claims, 11 Drawing Sheets

DAMPING MECHANISM, HINGE AND FOLDING ELECTRONIC DEVICE

CROSS-REFERENCE TO RELATED APPLICATION

The present application is proposed based on and claims priority to Chinese Patent Application No. 202111275802.X, filed on Oct. 29, 2021, the entire contents of which are incorporated herein by reference.

BACKGROUND

Foldable electronic devices have become more and more popular among consumers. In order to achieve the folded form in a device, it is usually necessary to provide hinges in the foldable electronic device, and the hinges are typically used to switch the foldable electronic devices between the unfolded form and the folded form.

SUMMARY

The present disclosure relates to the field of electronic devices, and in particular to a damping mechanism, a hinge and a foldable electronic device.

According to a first aspect of the present disclosure, a damping mechanism is provided, including a chamber, a movable blocking member and a power assembly. At least part of the movable blocking member is located in the chamber and cooperates with an inner wall face of the chamber to enclose a damping fluid cavity; at least one of the chamber and the movable blocking member defines a damping fluid circulation port in communication with the damping fluid cavity. The power assembly is abutted against the movable blocking member, and configured to drive the movable blocking member to move relative to the chamber to change the volume of the damping fluid cavity.

According to a second aspect of the present disclosure, a hinge is provided, including an intermediate bracket and a rotating coupling component rotatably coupled to the intermediate bracket, the rotating coupling component includes the damping mechanism, and the damping mechanism is configured to provide rotary damping force when the rotating coupling component rotates relative to the intermediate bracket. The damping mechanism includes a chamber, a movable blocking member and a power assembly. At least part of the movable blocking member is located in the chamber and cooperates with an inner wall face of the chamber to enclose a damping fluid cavity; at least one of the chamber and the movable blocking member defines a damping fluid circulation port in communication with the damping fluid cavity. The power assembly is abutted against the movable blocking member, and configured to drive the movable blocking member to move relative to the chamber to change the volume of the damping fluid cavity.

According to a third aspect of the present disclosure, a foldable electronic device is provided, including a foldable screen and at least one hinge. The hinge includes an intermediate bracket and a rotating coupling component rotatably coupled to the intermediate bracket, the rotating coupling component includes the damping mechanism, and the damping mechanism is configured to provide rotary damping force when the rotating coupling component rotates relative to the intermediate bracket. The damping mechanism includes a chamber, a movable blocking member and a power assembly. At least part of the movable blocking member is located in the chamber and cooperates with an inner wall face of the chamber to enclose a damping fluid cavity; at least one of the chamber and the movable blocking member defines a damping fluid circulation port in communication with the damping fluid cavity. The power assembly is abutted against the movable blocking member, and configured to drive the movable blocking member to move relative to the chamber to change the volume of the damping fluid cavity.

BRIEF DESCRIPTION OF THE DRAWINGS

The accompanying drawings, which are incorporated into and constitute a part of the specification, illustrate embodiments consistent with the present invention and together with the description intend to explain principles of the present invention.

DETAILED DESCRIPTION

Exemplary embodiments will be described here in detail, examples of which are illustrated in the accompanying drawings. When the following description involves the drawings, unless otherwise indicated, same numbers in different drawings indicate same or similar elements. Implementations described in the following exemplary embodiments do not represent all embodiments consistent with the present invention. On the contrary, they are only examples of devices and methods consistent with some aspects of the present invention as detailed in the appended claims.

A hinge of a foldable electronic device usually includes an intermediate bracket and supporting parts provided at both sides of the intermediate bracket and rotatably coupled to the intermediate bracket, and the supporting parts at both sides each support the two middle frames of the foldable electronic device. The supporting part and the intermediate bracket are rotatably coupled through cooperation of a rotating shaft and a shaft hole. In order to ensure smoothness of rotation of the rotating shaft, a surface of the rotating shaft and a hole wall of the shaft hole are set to be smooth, which leads to a poor hand feeling of the foldable electronic device during form switching. In addition, the structure of the foldable electronic device will be impacted if a user exerts too much force during form switching, which will affect the service life of the foldable electronic device.

In order to solve the above technical problems, the present disclosure provides a damping mechanism, which includes a damping fluid cavity formed by enclosure of a movable blocking member and a chamber, and a damping fluid circulation port communicating the damping fluid cavity with the outside. When a power assembly drives the movable blocking member to move, a flow speed of a damping fluid is limited by the damping fluid circulation port, to provide damping force for movement of the power assembly and ensure smoothness of movement of the power assembly. When a foldable electronic device adopts the damping mechanism, the damping mechanism can provide damping force when the foldable electronic device is switched in form, effectively improve a hand feeling, and meanwhile can avoid an impact on the structure of the foldable electronic device caused by an excessive stress during form switching, thereby prolonging the service life of the foldable electronic device.

Figure 1:
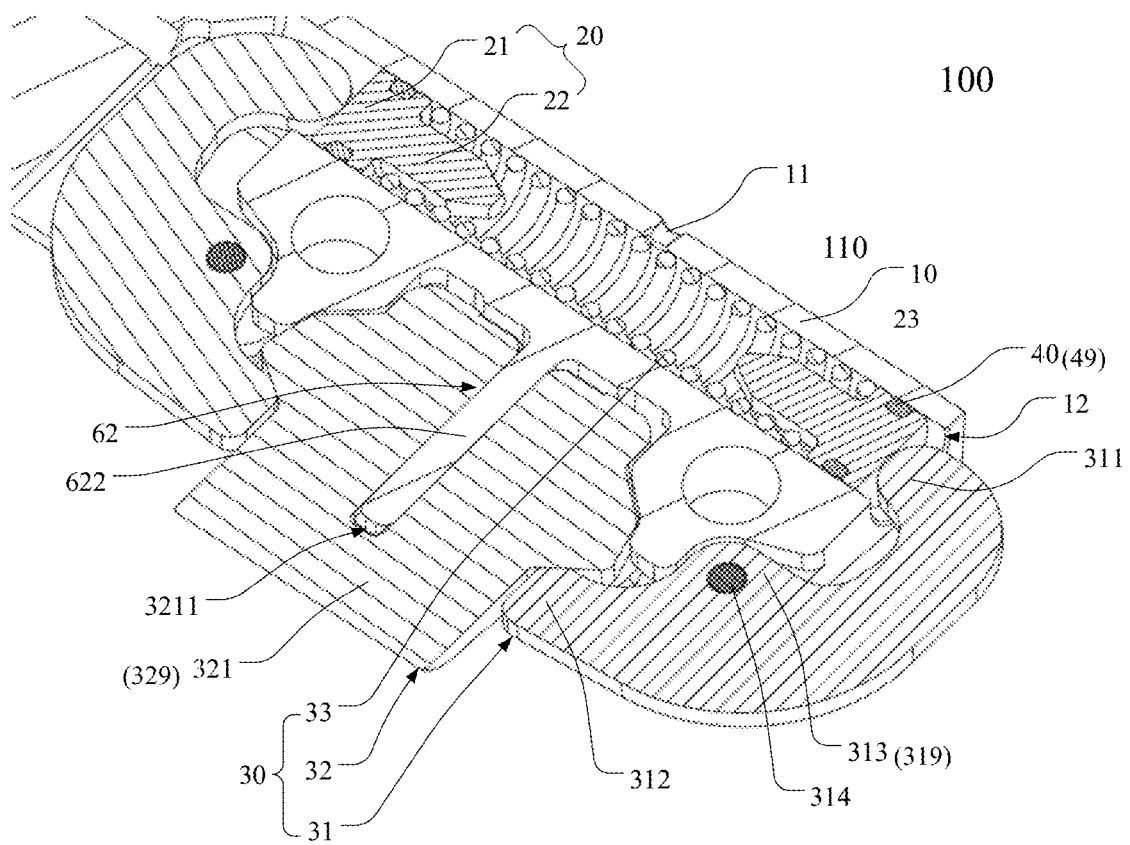
FIG. 1 is a sectional view of a damping mechanism according to an exemplary embodiment.

An embodiment of the present disclosure provides a damping mechanism 100, as illustrated in FIG. 1, the damping mechanism 100 includes a chamber 10, a movable blocking member 20 and a power assembly 30. At least part of a structure of the movable blocking member 20 is located in the chamber 10, and cooperates with an inner wall face of the chamber 10 to enclose a damping fluid cavity 110. The damping fluid cavity 110 is configured to accommodate a damping fluid. At least one of the chamber 10 and the movable blocking member 20 defines a damping fluid circulation port 11, and the damping fluid circulation port 11 is communicated with the damping fluid cavity 110, so that the damping fluid cavity 110 can exchange the damping fluid with the outside (the space outside the damping fluid cavity 110) through the fluid circulation port 11.

The power assembly 30 is abutted against the movable blocking member 20, and the power assembly 30 is configured to drive the movable blocking member 20 to move relative to the chamber 10 to change a volume of the damping fluid cavity 110. For example, the power assembly 30 can drive the blocking member 20 to move relative to the chamber 10 to reduce the volume of the damping fluid cavity 110. At this time, the damping fluid in the damping fluid cavity 110 is squeezed and discharged to the outside through the damping fluid circulation port 11. For example, the power assembly 30 can drive the blocking member 20 to move relative to the chamber 10 to increase the volume of the damping fluid cavity 110. At this time, under a negative pressure, the external damping fluid enters the damping fluid cavity 110 through the damping fluid circulation port 11.

In the damping mechanism 100 provided by the present embodiment, the chamber 10 cooperates with the movable blocking member 20 to enclose the damping fluid cavity 110, and at least one of the chamber 10 and the movable blocking member 20 defines the damping fluid circulation port 11 in communication with the damping fluid cavity 110. When the power assembly 30 drives the movable blocking member 20 to move to change the volume of the damping fluid cavity 110, the damping fluid can flow between the damping fluid cavity 110 and the outside through the damping fluid circulation port 11. The damping fluid circulation port 11 can limit a flow speed of damping fluid, thereby providing damping force to movement of the power assembly 30, so that the power assembly 30 can move smoothly. When the damping mechanism 100 is applied to a hinge of a foldable electronic device, the damping mechanism 100 can provide damping force when the foldable electronic device is switched in form (see the following description for details), effectively improve a hand feeling, and meanwhile can avoid an impact on the structure of the foldable electronic device caused by an excessive stress during form switching, thereby prolonging the service life of the hinge and the foldable electronic device.

It can be understood that the movable blocking member 20 can be partially located in the chamber 10, completely located in the chamber 10, or can be driven by the power assembly 30 to move between a position completely located in the chamber 10 and a position partially located in the chamber 10, which is not limited by the present disclosure.

Figure 2:
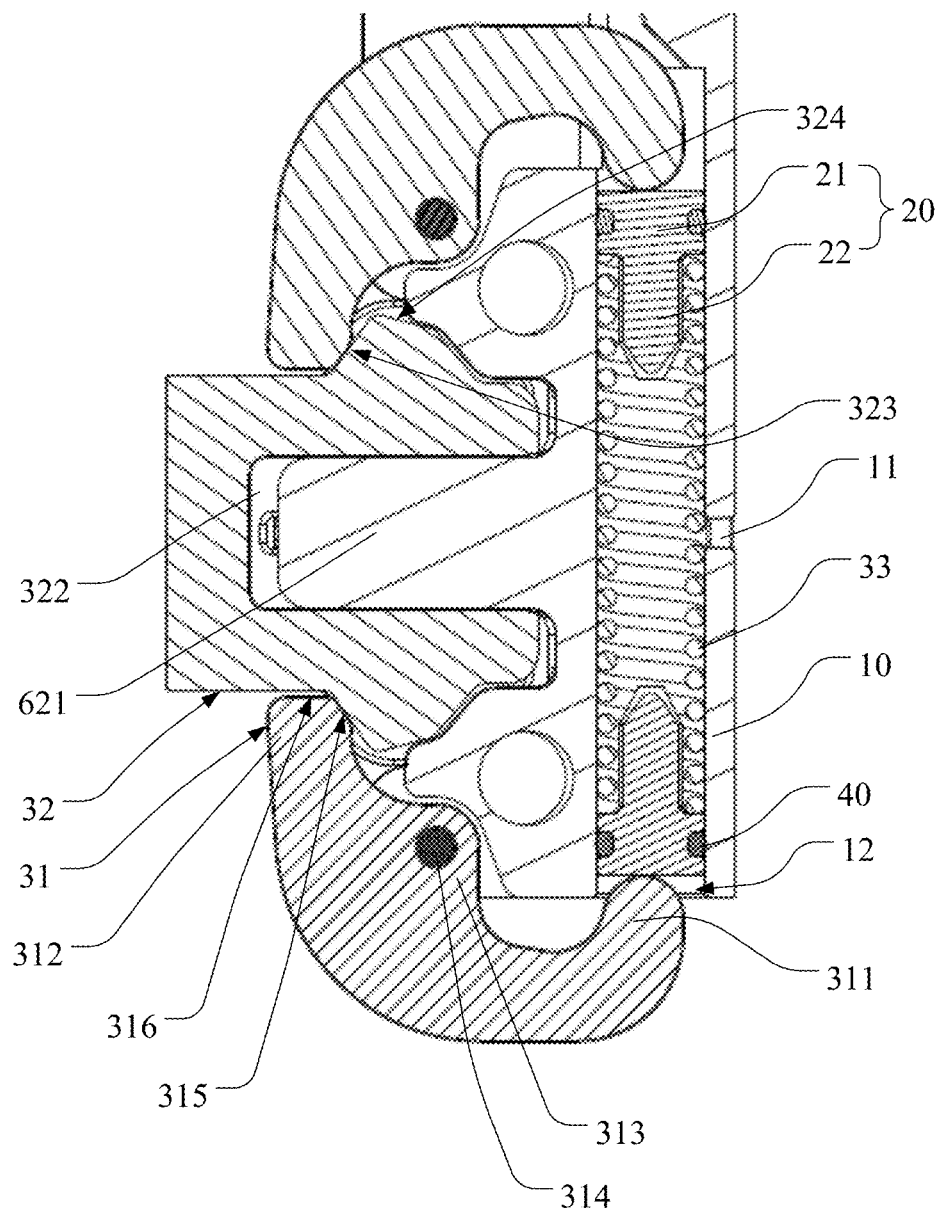
FIG. 2 is a schematic diagram of the damping mechanism illustrated in FIG. 1 when a transmission member is at a first rotation position.

According to an exemplary embodiment, as illustrated in FIG. 1, the chamber 10 has an elongated structure, and the elongated structure here refers to a structure has a size in one direction (i.e., an extending direction) larger than those in other directions, such as columnar structures like a cylinder. It can be understood that the one direction mentioned here may be a straight direction or a curved direction, which is not limited in the present disclosure. The movable blocking member 20 is slidably fitted in the chamber 10, so that the movable blocking member 20 can slide along the extending direction of the chamber 10. For example, as illustrated in FIGS. 1 and 2, the movable blocking member 20 includes a blocking part 21 matched with a shape of the chamber 10, and the blocking part 21 can slide along the extending direction of the chamber 10, so that the blocking part 21 and the inner wall face of the chamber 10 cooperate to enclose the elongated damping fluid cavity 110. When the blocking part 21 slides along the extension direction of the chamber 10, a length of the elongated damping fluid cavity 110 can be changed, to change the volume of the damping fluid cavity 110.

In some embodiments, the chamber 10 has a structure with equal cross-sectional areas at all positions, thereby ensuring that the volume of the damping fluid cavity 110 changes approximately linearly when the movable blocking member 20 moves, to provide uniform damping force to the power assembly 30.

In one embodiment, a sealing structure 49 is provided between the movable blocking member 20 and the inner wall face of the chamber 10, to ensure tightness between the movable blocking member 20 and the inner wall face of the chamber 10 during movement of the movable blocking member 20. In this way, the damping fluid can only flow through the damping fluid circulation port 11, to limit the flow speed of the damping fluid by utilizing the damping fluid circulation port 11 and avoid leakage of the damping fluid between the movable blocking member 20 and the inner wall face of the chamber 10.

In some embodiments, as illustrated in FIG. 2, an outer circumferential face of the blocking part 21 defines an annular groove, and the sealing structure 49 includes a sealing ring 40 provided in the annular groove, and an outer circumferential face of the sealing ring 40 is attached to the inner wall face of the chamber 10, to realize sealing between the movable blocking member 20 and the inner wall face of the chamber 10.

A circulation area of the damping fluid circulation port 11 is smaller than a cross-sectional area of the damping fluid cavity 110. The circulation area of the damping fluid circulation port 11 here refers to an area of the cross section of the damping fluid circulation port 11 perpendicular to a flow direction of the damping fluid. Because the circulation area of the damping fluid circulation port 11 is small, when the blocking part 21 slides along the extension direction of the chamber 10, a flow rate of the damping fluid at the damping fluid circulation port 11 is limited, thereby realizing a damping hysteresis effect on movement of the blocking part 21.

In one embodiment, the damping fluid circulation port 11 is defined in the movable blocking member 20, and when the movable blocking member 20 moves, the damping fluid flows between the damping fluid cavity 110 and the outside through the damping fluid circulation port 11 in the movable blocking member 20. In other embodiments, the damping fluid circulation port 11 is defined in the chamber 10, for example, at a middle position in the extending direction of the chamber 10, as illustrated in FIG. 1. Of course, it can be understood that each of the movable blocking member 20 and the chamber 10 may define the damping fluid circulation port 11, which are not limited by the present disclosure.

According to an exemplary embodiment, the chamber 10 defines an opening 12, and the movable blocking member 20 can be mounted into the chamber through the opening 12. In the embodiment where the chamber 10 has the elongated structure, the opening 12 can be defined in one end of the chamber 10, and one movable blocking member 20 is correspondingly provided. The movable blocking member 20 is mounted into the chamber 10 through the opening 12, and the other end of the chamber 10 is closed. The movable blocking member 20 moves toward the closed end of the chamber 10 to reduce the volume of the damping fluid cavity 110, and the movable blocking member 20 moves away from the closed end to increase the volume of the damping fluid cavity 110.

In other embodiments, the openings 12 may also be defined in both ends of the chamber 10 as illustrated in FIG. 1, and two movable blocking members 20 are correspondingly provided. The two movable blocking members 20 are respectively mounted into the chamber 10 through the openings 12 in both ends of the chamber 10. The two movable blocking members 20 move close to each other (refer to FIGS. 3 and 4) to reduce the volume of the damping fluid cavity 110, and the two movable blocking members 20 move away from each other to increase the volume of the damping fluid cavity 110.

Figure 3:
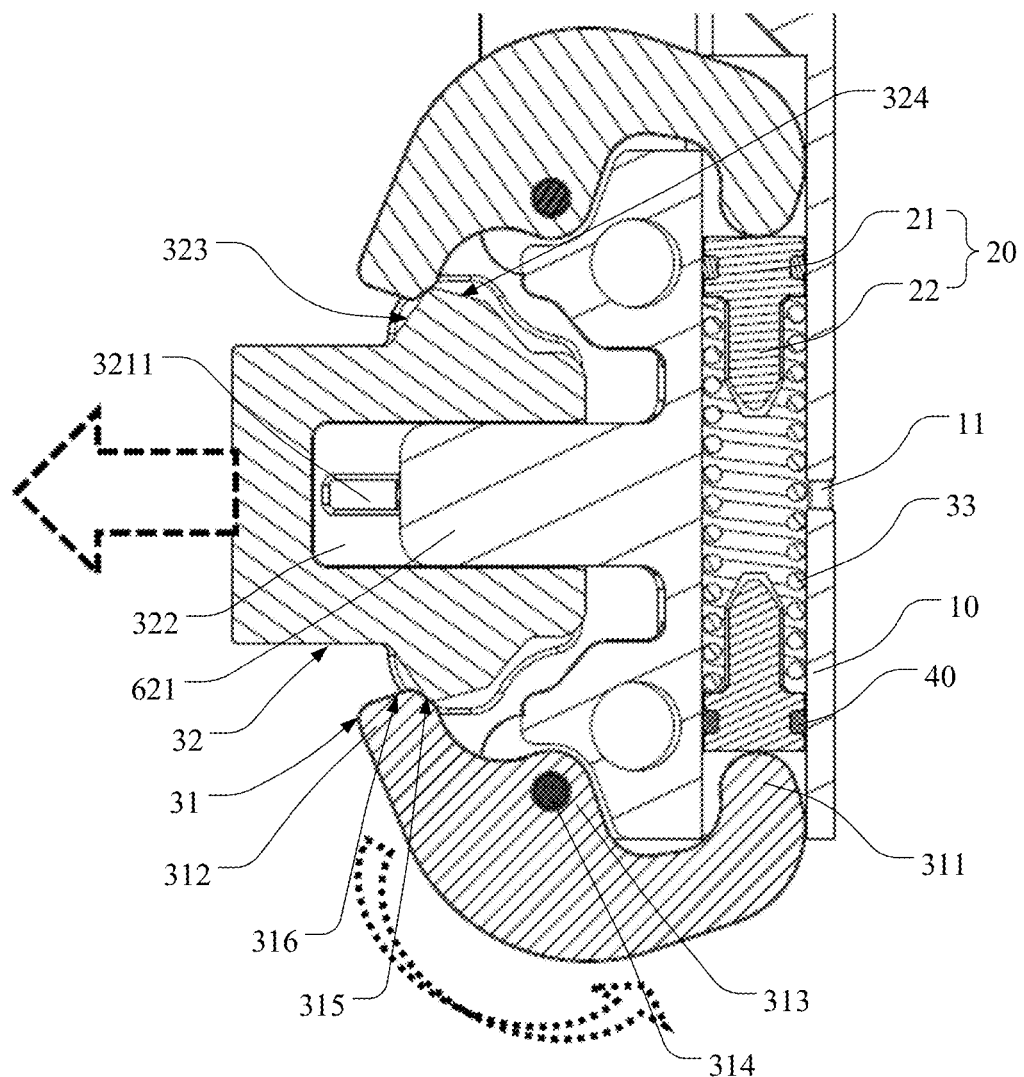
FIG. 3 is a schematic diagram of the damping mechanism illustrated in FIG. 1 when a transmission member is at an intermediate position between a first rotation position and a second rotation position.
Figure 4:
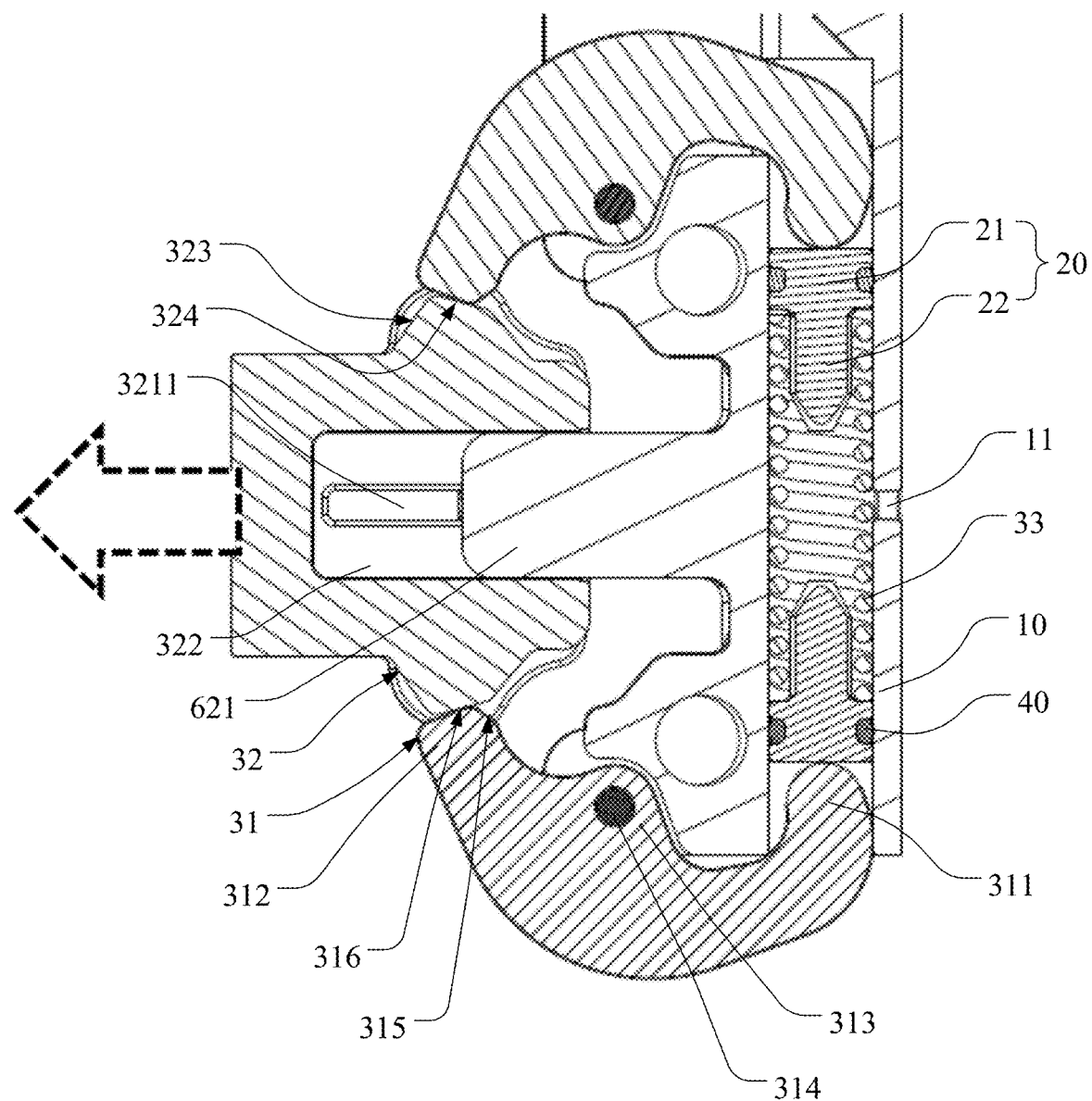
FIG. 4 is a schematic diagram of the damping mechanism illustrated in FIG. 1 when a transmission member is at a second rotation position.

The power assembly 30 includes a transmission member 31, the transmission member 31 is provided with a first rotating coupling part 319 (described in detail below), and the transmission member 31 can rotate around an axis of the first rotating coupling part 319. A first end 311 of the transmission member 31 in a rotation direction is coupled to the movable blocking member 20 through the opening 12, and a second end 312 of the transmission member 31 in the rotation direction is a force receiving end. In this way, when a force is acted on the second end 312 of the transmission member 31, the transmission member 31 rotates around the axis of the first rotating coupling part 319, so that the first end 311 of the transmission member 31 drives the movable blocking member 20 to move. In some embodiments, the transmission member 31 has a first rotation position as illustrated in FIG. 2 and a second rotation position as illustrated in FIG. 4. At the first rotation position, the damping fluid cavity 110 has a larger volume. As illustrated in FIG. 3, when the transmission member 31 rotates from the first rotation position to the second rotation position, the first end 311 of the transmission member 31 pushes the movable blocking member 20 to move, thereby squeezing the damping fluid in the damping fluid cavity 110, and the damping fluid is discharged through the damping fluid circulation port 11. As illustrated in FIG. 4, when the transmission member rotates to the second rotation position, the volume of the damping fluid cavity 110 is reduced.

The above-mentioned first end 311 is coupled to the movable blocking member 20 through the opening 12, which may be that the movable blocking member 20 is located inside the chamber 10, the first end 311 is coupled to the movable blocking member 20 through the opening 12, or part of the structure of the movable blocking member 20 is exposed through the opening 12, and the first end 311 is coupled to the exposed part of the movable blocking member 20. Coupling between the first end 311 and the movable blocking member 20 can be that they abut against each other, or that they can be flexibly coupled by rotating coupling or other modes.

In some embodiments, as illustrated in FIG. 2, the first end 311 of the transmission member 31 in the rotation direction is abutted against the movable blocking member 20 to apply a pressure along a first direction to the movable blocking member 20. For example, when a force is acted on the second end of the transmission member 31 at the first rotation position, the transmission member 31 rotates to the second rotation position to push the movable blocking member 20 to move, thereby changing the volume of the damping fluid cavity 110. In the present embodiment, because the transmission member 31 is abutted against the movable blocking member 20, the transmission member 31 cannot drive the movable blocking member 20 to move together when the transmission member moves from the second rotation position to the first rotation position. Therefore, the power assembly 30 further includes an elastic reset member 33 provided in the chamber 10, and the elastic reset member 33 is configured to apply a pressure to the movable blocking member 20 in a second direction opposite the first direction, to push the movable blocking member 20 to reset by the elastic reset member 33.

In some embodiments, the movable blocking member 20 includes a guide rod part 22 located in the chamber 10, the guide rod part 22 is coupled to an inner side of the blocking part 21, the blocking part 21 is hermetically coupled to the chamber 10, and a junction of the blocking part 21 and the guide rod part 22 is provided with a step face 23. For example, the blocking part 21 and the guide rod part 22 form a stepped shaft, and a stepped face of the stepped shaft constitutes the step face 23. The first end 311 of the transmission member 31 is abutted against the blocking part 21, and the elastic reset member 33 is fitted over the guide rod part 22 and is abutted against the step face 23, so that when the transmission member 31 drives the movable blocking member 20 to move, the guide rod part 22 is utilized to guide and limit movement of the elastic reset member 33, and ensure smoothness of movement thereof. For example, the elastic reset member 33 may be a coil spring.

In one embodiment, a free end of the guide rod part 22 is provided with a guide structure for guiding mounting of the elastic reset member 33, to facilitate mounting of the elastic reset member 33. In some embodiments, the free end of the guide rod part 22 has a frustum-shaped or hemispherical structure.

In other embodiments, the transmission member 31 is rotatably coupled to the movable blocking member 20, so that the transmission member 31 can drive the movable blocking member 20 to move synchronously. For example, when the transmission member 31 rotates from the first rotation position to the second rotation position, the transmission member can drive the movable blocking member 20 to compress the damping fluid cavity 110, while when the transmission member 31 rotates from the second rotation position to the first rotation position, the transmission member can drive the movable blocking member 20 to move in the opposite direction to increase the damping fluid cavity 110. In other embodiments, the transmission member 31 may also be coupled to the movable blocking member 20 by other flexible coupling modes. For example, the transmission member 31 is coupled to the movable blocking member 20 through a telescopic bellows.

Figure 5:
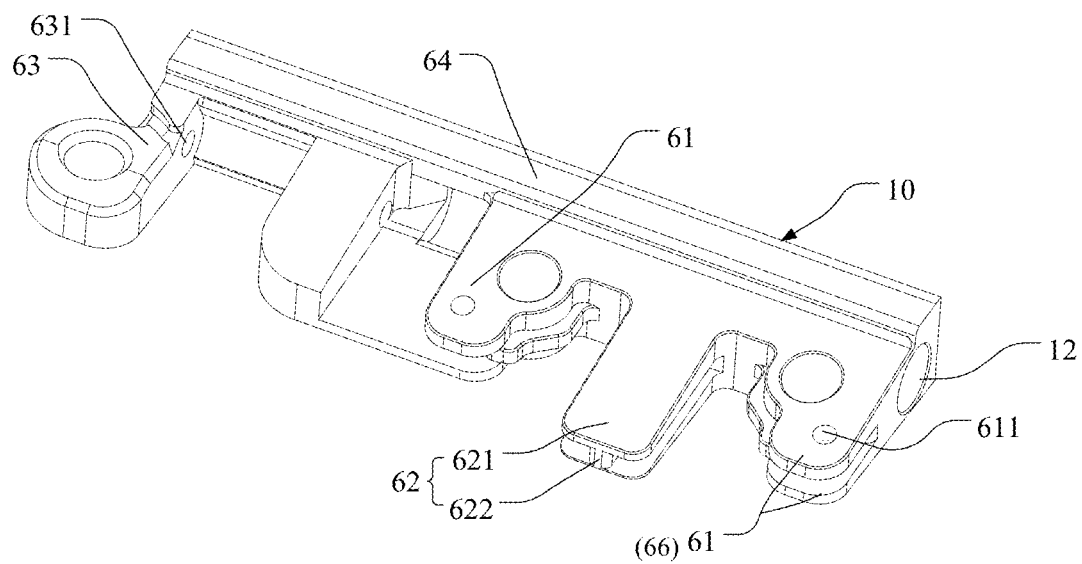
FIG. 5 is a schematic diagram of a fixed seat in the damping mechanism illustrated in FIG. 1.

According to an exemplary embodiment, the damping mechanism 100 further includes a fixed seat 60. As illustrated in FIG. 5, the fixed seat 60 includes a fixed seat body 64, and the fixed seat body 64 defines the chamber 10. The fixed seat 60 further includes a second rotating coupling part 66 located at a side of the chamber 10. The first rotating coupling part 319 is fitted with the second rotating coupling part 66 to rotatably couple the transmission member 31 to the fixed seat 60. The fixed seat 60 can not only define the chamber 10, but can also realize rotating coupling with the transmission member 31, and hence the structure is simpler and more compact.

In some embodiments, as illustrated in FIG. 5, the fixed seat body 64 has an elongated block structure, and the elongated block structure defines a through hole penetrating along an extending direction thereof, so that the elongated block structure with the through hole constitutes the above-mentioned chamber 10. The second rotating coupling part 66 includes two first limit plate parts 61 which are formed by extending from a side of the fixed seat body 64 and are provided at intervals, and the two first limit plate parts 61 each defines a first pin hole 611. As illustrated in FIG. 1, the first rotating coupling part 319 includes a coupling plate part 313 and a second pin hole (not illustrated in the figure) defined in the coupling plate part 313. In an assembled state, the coupling plate part 313 is located between the two first limit plate parts 61, the first pin hole 611 and the second pin hole are correspondingly arranged, and a pin shaft 314 penetrates through the first pin hole 611 and the second pin hole, thereby realizing rotating coupling between the transmission member 31 and the fixed seat 60.

In other embodiments, the first rotating coupling part 319 may also be a rotating shaft provided on the transmission member 31, and the second rotating coupling part 66 is a rotating shaft hole having an opening at one side and defined in the fixed seat 60. The rotating shaft on the transmission member 31 can be snapped into the rotating shaft hole through the opening. Rotating coupling between the transmission member 31 and the fixed seat 60 can also be realized.

According to an exemplary embodiment, the fixed seat 60 is provided with a guide part 62, and the power assembly 30 further includes a driving member 32 slidably fitted with the guide part 62. The driving member 32 is coupled to the second end 312 of the transmission member 31 in the rotation direction. In some embodiments, the driving member 32 includes a driving part 329, and the driving part 329 is slidably fitted with the guide part 62 and coupled to the second end 312 of the transmission member 31 in the rotation direction. In this way, the driving member 32 can move along the guide part 62. In some embodiments, as illustrated in FIG. 5, the guide part 62 is located at the same side of the chamber 10 as the second rotating coupling part 66. The guide part 62 includes a protruded structure extending from the fixed seat body to a side away from the chamber 10. The cross-sectional shape of the protruded structure is I-shaped, and the protruded structure includes two second limit plate parts 621 provided at intervals, and opposite sides of the two second limit plate parts 621 are coupled by a guide bar 622. Correspondingly, the driving part 329 defines a guide through slot 3211. In an assembled state, part of the structure of the driving part 329 is located between two second limit plate parts 621, and the guide bar 622 is slidably fitted in the guide through slot 3211. Therefore, through fitting of the second limit plate part 621 and the guide bar 622 with the driving part 329, relative movement of the driving member 32 and the fixed seat 60 can be well limited and guided, and reliability of the relative movement therebetween can be ensured.

In some embodiments, as illustrated in FIG. 1 and FIG. 3, the driving part 329 includes a guide plate part 321, and the guide through slot 3211 is defined in the guide plate part 321. In an assembled state, the guide plate part 321 is located between two second limit plate parts 621, and the guide bar 622 is located in the guide through slot 3211 and can slide along the guide through slot 3211, to realize sliding fit between the guide part 62 and the driving member 32.

As illustrated in FIG. 2, the driving part 329 of the driving member 32 defines a groove 322 fitted with the second limit plate part 621, and a groove bottom wall of the groove 322 constitutes the above-mentioned guide plate part 321. In an assembled state, the second limit plate part 621 is located in the groove 322, so that when the guide part 62 and the driving member 32 slide relatively, the guide bar 622 slides along the guide through slot 3211 and the second limit plate part 621 slides along the groove 322, thereby improving their sliding smoothness.

In some embodiments, the driving member 32 includes a first fitting face 323 and a second fitting face 324 coupled and provided at an angle. When the transmission member 31 is at the first rotation position, the transmission member 31 is fitted with the first fitting face 323, and when the transmission member 31 is at the second rotation position, the transmission member 31 is fitted with the second fitting face 324. Because there is the angle between the first fitting face 323 and the second fitting face 324, the transmission member 31 can remain at the first rotation position or the second rotation position.

In some embodiments, as illustrated in FIG. 2, a protruding direction of the guide part 62 is perpendicular to the extending direction of the chamber 10, the first fitting face 323 and the second fitting face 324 have angles with the protruding direction of the guide part 62, and the second fitting face 324 is provided closer to the chamber 10 than the first fitting face 323. As illustrated in FIG. 1, the transmission member 31 has an overall bent structure, and the first end 311 of the transmission member 31 is provided with a hook part, the hook part extends into the chamber 10 through the opening 12 of the chamber 10 and is abutted against the movable blocking member 20 in the chamber 10. For example, a face of the hook part abutting against the movable blocking member 20 is an arc face, thereby improving smoothness of relative movement between the hook part and the movable blocking member 20 when the transmission member 31 rotates. The first rotating coupling part 319 is provided at a bending position of the transmission member 31, thereby ensuring good torque transmission between the first end 311 and the second end 312 of the transmission member 31. For example, as still illustrated in FIG. 1, the coupling plate part 313 is formed by protruding from the bending position of the transmission member 31 toward the fixed seat 60.

The second end 312 of the transmission member 31 is abutted against the driving member 32. As illustrated in FIG. 2, when the transmission member 31 is at the first rotation position, the transmission member 31 is abutted against the first fitting face 323. As illustrated in FIG. 3, when the driving member 32 moves along the guide part 62 in the direction away from the chamber 10, the transmission member 31 slides along the first fitting face 323, and the first fitting face 323 pushes the transmission member 31 up, so that the transmission member 31 rotates in the second rotation direction. When the transmission member 31 passes over a sharp corner position between the first fitting face 323 and the second fitting face 324, as illustrated in FIG. 4, the transmission member 31 is abutted against the second fitting face 324, so that the transmission member 31 is stabilized at the second rotation position. When the driving member 32 moves in the reverse direction along the guide part 62, an action process of the transmission member 31 is opposite the above-mentioned process, which will not be repeated here.

In order to better fit with the driving member 32, in some embodiments, the second end 312 of the transmission member 31 is provided with a transition structure fitted with the first fitting face 323 and the second fitting face 324. In some embodiments, as illustrated in FIG. 2, the transition structure includes a third fitting face 315 and a fourth fitting face 316 coupled and provided at an angle. When the transmission member 31 is at the first rotation position, the third fitting face 315 of the transmission member 31 is attached to the first fitting face 323 of the driving member 32, and the fourth fitting face 316 of the transmission member 31 is attached to the second fitting face 324 of the driving member 32 when the transmission member 31 is at the second rotation position, thereby ensuring positional reliability of the transmission member 31 at the first rotation position and the second rotation position.

Figure 6:
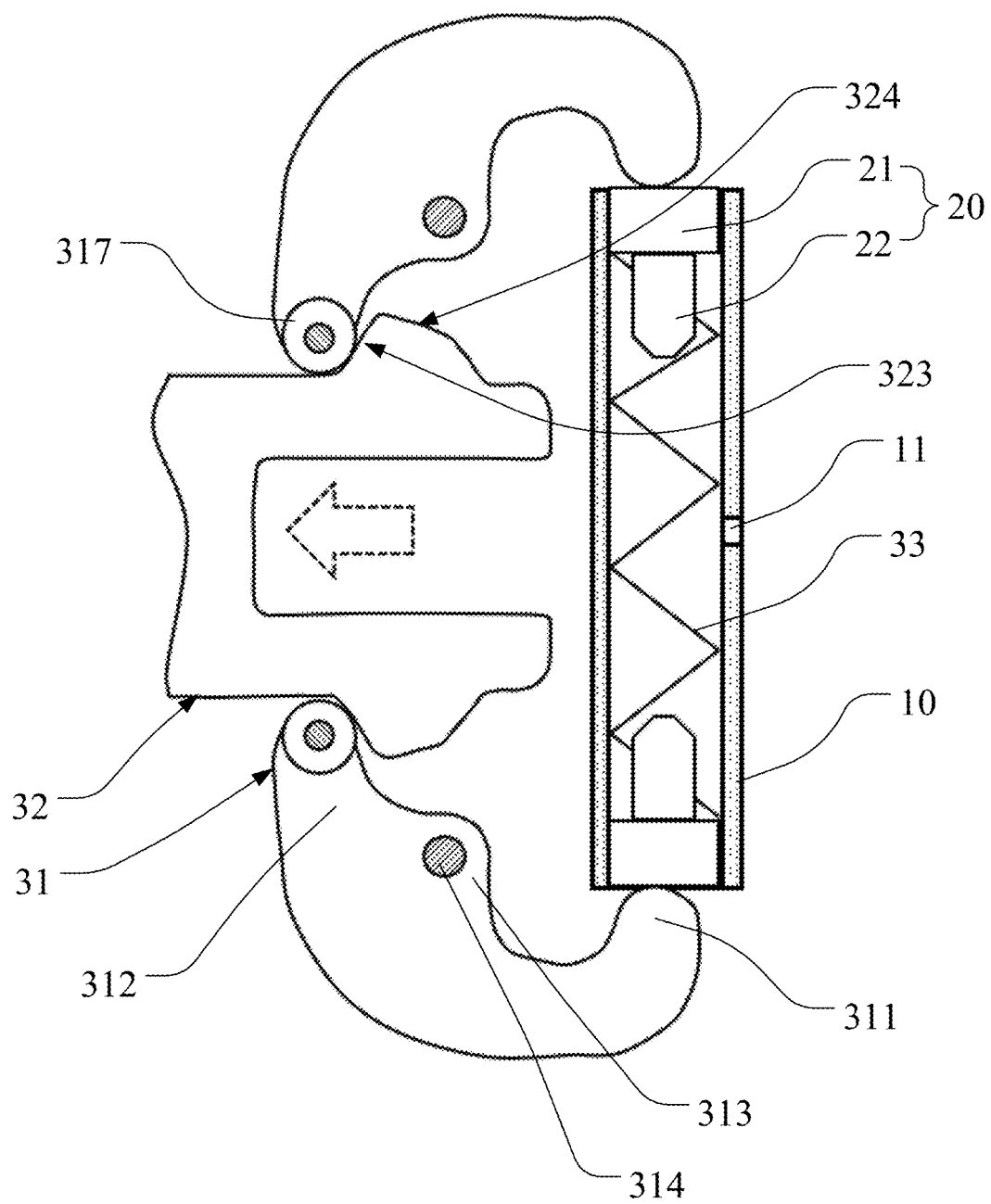
FIG. 6 is a schematic diagram of a damping mechanism according to an exemplary embodiment.

In other embodiments, as illustrated in FIG. 6, the second end 312 of the transmission member 31 in the rotation direction is provided with a roller 317, and the roller 317 rolls along the first fitting face 323 and the second fitting face 324, so that the driving member 32 can drive the transmission member 31 to rotate. As the roller 317 is in rolling friction with the first fitting face 323 and the second fitting face 324, the wear resistance and service life of the damping mechanism 100 can be improved, and at the same time, the damping mechanism 100 has a good damping function.

Figure 7:
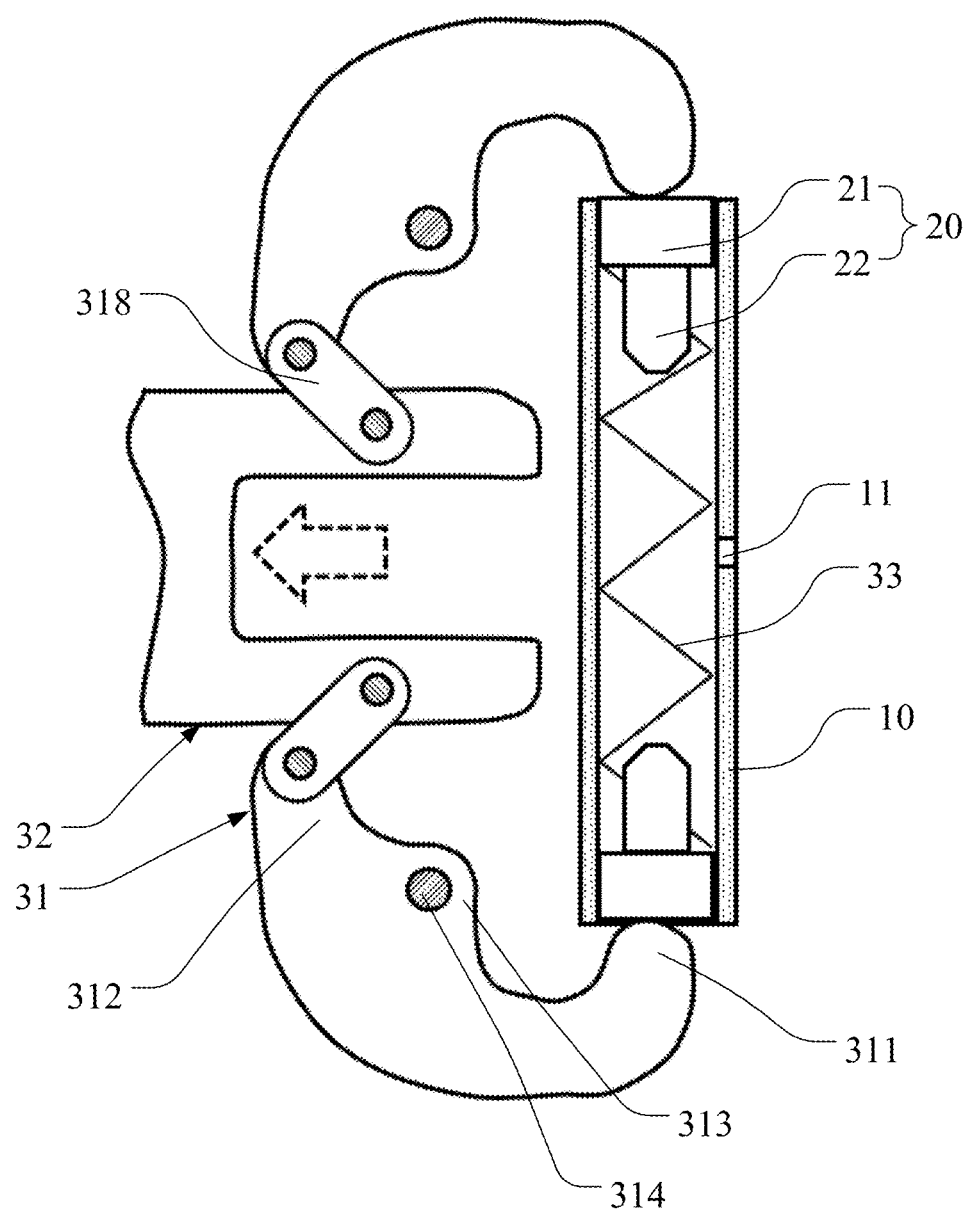
FIG. 7 is a schematic diagram of a damping mechanism according to an exemplary embodiment when a transmission member is at a first rotation position.
Figure 8:
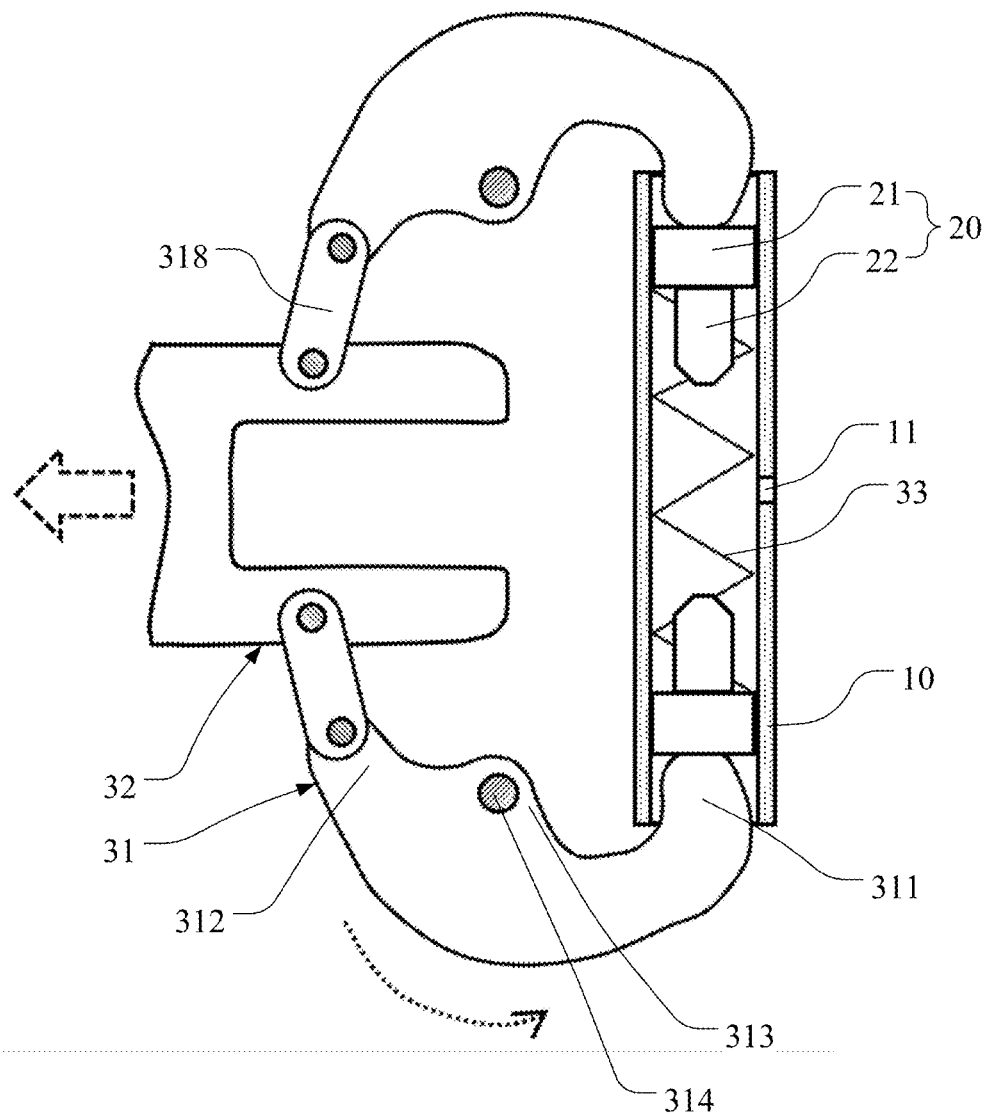
FIG. 8 is a schematic diagram of a damping mechanism according to an exemplary embodiment when a transmission member is at a second rotation position.

Of course, it can be understood that the second end 312 of the transmission member 31 may also be coupled to the driving member 32 through a coupling structure. For example, in the embodiments illustrated in FIGS. 7 and 8, the driving member 32 is coupled to the transmission member 31 through a first coupling rod 318 to drive the transmission member 31 to rotate between the first rotation position and the second rotation position. In some embodiments, one end of the first coupling rod 318 is rotatably coupled to the driving member 32, and the other end is rotatably coupled to the second end 312 of the transmission member 31. The transmission member 31, the first coupling rod 318, the driving member 32 and the guide part 62 constitute a crank-slider mechanism. As illustrated in FIG. 8, when the driving member 32 slides away from the chamber 10 along the guide part 62, the driving member 32 drives the transmission member 31 to rotate in the second rotation direction through the first coupling rod 318, so that the movable blocking member 20 compresses the damping fluid cavity 110. On the contrary, when the driving member 32 slides along the guide part 62 in the direction close to the chamber 10, the driving member 32 drives the transmission member 31 to rotate in the first rotation direction through the first coupling rod 318, so that the movable blocking member 20 moves in the opposite direction under the action of the transmission member 31 or the elastic reset member 33 to expand the damping fluid cavity 110.

In some embodiments, one end of the chamber 10 defines an opening 12, and a movable blocking member 20 and a transmission member 31 are correspondingly provided. In other embodiments, as illustrated in FIG. 2, both ends of the chamber 10 define the openings 12, and each opening 12 is provided with a movable blocking member 20, and each movable blocking member 20 is correspondingly provided with a transmission member 31. Correspondingly, two second rotating coupling parts 66 are provided at intervals, and respectively fitted with the first rotating coupling parts 319 of the two transmission members 31. The guide part 62 may be provided between the two second rotating coupling parts 66, or at a side of one of the second rotating coupling parts 66, or simultaneously between the two second rotating coupling parts 66 and at a side of one of the second rotating coupling parts 66.

In the embodiment in which the guide part 62 is provided between the two second rotating coupling parts 66, the driving member 32 is separately coupled to the second ends of the two transmission members 31, so that one driving member 32 can synchronously drive the two transmission members 31, and the structure is simpler and more compact. For example, as illustrated in FIG. 4, the driving part 329 of the driving member 32 has a plate-like structure as a whole, the groove 322 and the guide through slot 3211 are defined in the middle of the driving part 329, and both sides of the driving part 329 are provided with a group of combined faces of the first fitting face 323 and the second fitting face 324, to be respectively fitted with the transmission members 31 on both sides.

In one embodiment, both sides of the driving part 329 each define a guide groove, a groove bottom face of the guide groove forms the first fitting face 323 and the second fitting face 324, and the second end of the transmission member 31 extends into the guide groove and is fitted with the groove bottom face of the guide groove. Provision of the guide groove can further improve reliability of movement between the transmission member 31 and the driving member 32.

Figure 9:
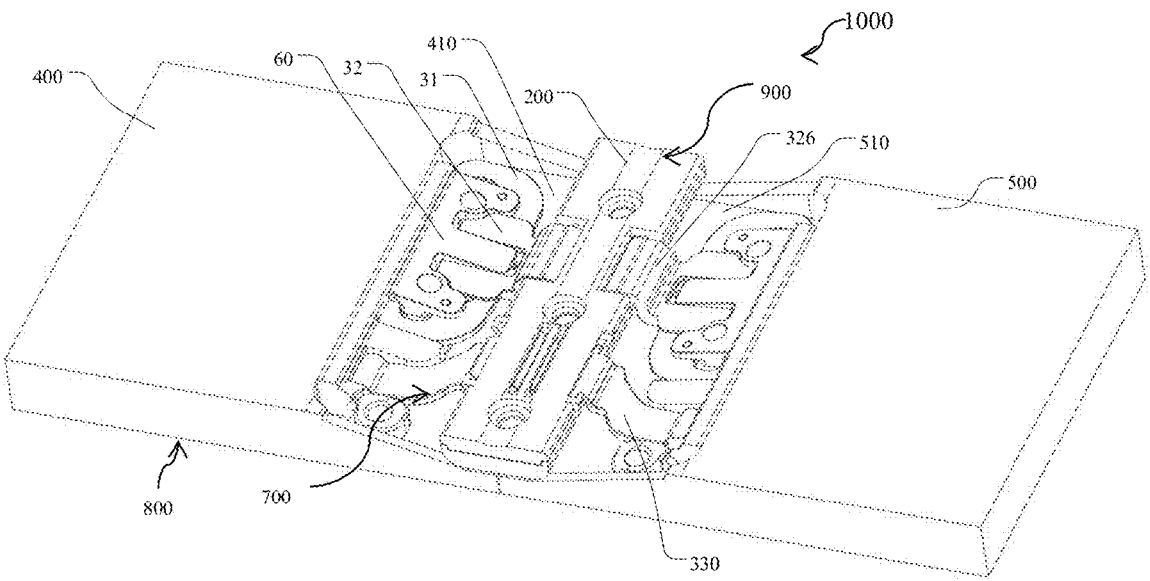
FIG. 9 is a perspective view of fitting between a hinge and left and right middle frames according to an exemplary embodiment.
Figure 10:
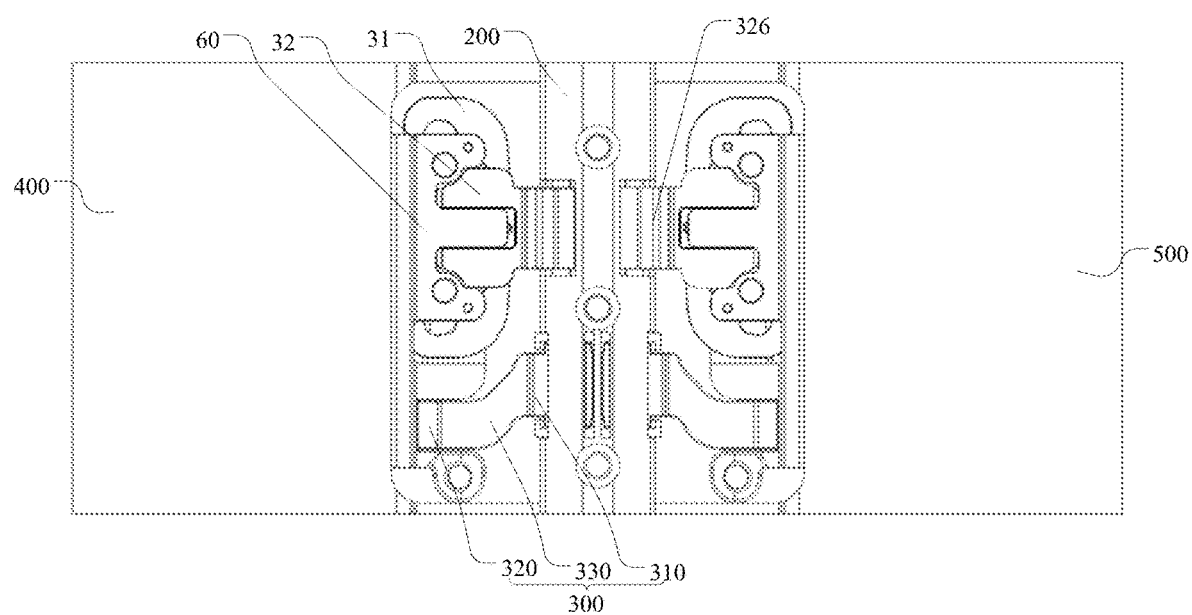
FIG. 10 is a top view of fitting between a hinge and left and right middle frames according to an exemplary embodiment.
Figure 11:
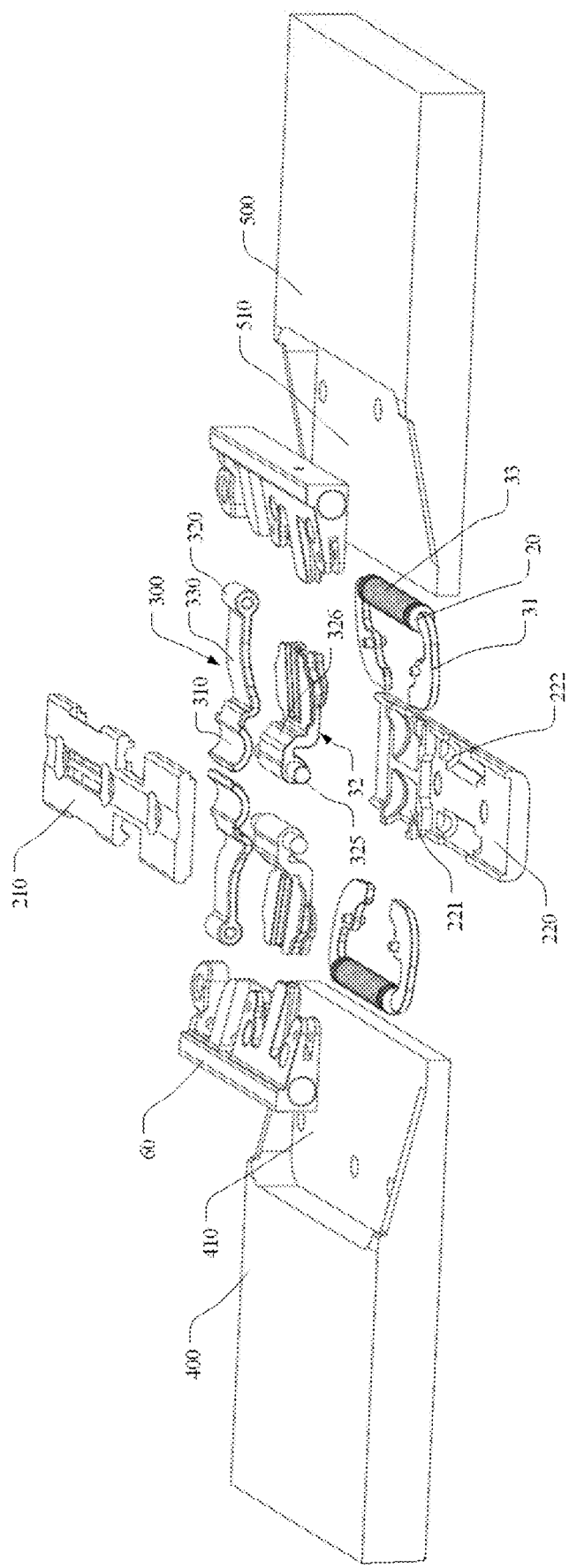
FIG. 11 is an exploded view of a hinge and left and right middle frames according to an exemplary embodiment.

Embodiments of the present disclosure further provides a hinge 900, as illustrated in FIGS. 9 to 11, the hinge 900 includes an intermediate bracket 200 and a rotating coupling component 700 rotatably coupled to the intermediate bracket 200. The rotating coupling component 700 includes the damping mechanism 100 as described in the above embodiments, and the damping mechanism 100 is configured to provide rotating damping force when the rotating coupling component 700 rotates relative to the intermediate bracket 200, to improve a hand feeling of the hinge 900 during rotation, avoid an impact on an internal structure of the hinge 900 due to excessive stress, and prolong the service life of the hinge 900. In some embodiments, the rotating coupling component 700 is provided at a side of the intermediate bracket 200, while in other embodiments, both sides of the intermediate bracket 200 are provided with the rotating coupling components 700.

Figure 12:
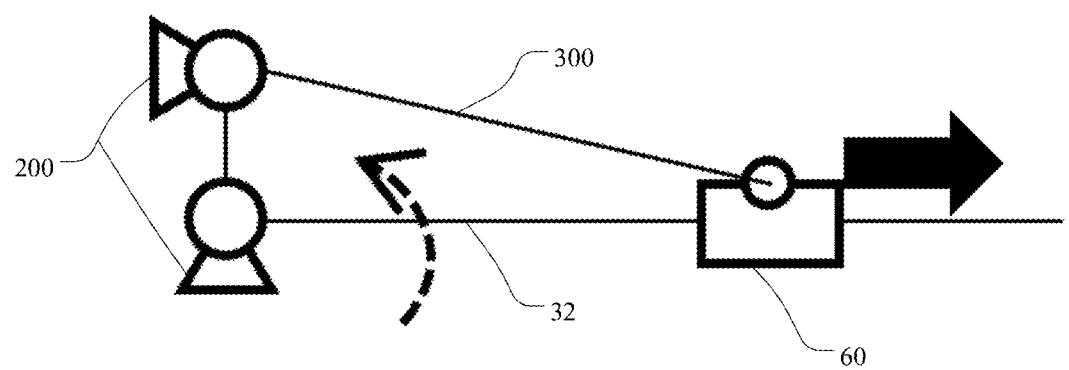
FIG. 12 is a schematic diagram of movement of a hinge according to an exemplary embodiment.

In one embodiment, as illustrated in FIG. 11, the rotating coupling component 700 includes a second coupling rod 300, the second coupling rod 300 has one end rotatably coupled to the intermediate bracket 200 and the other end rotatably coupled to the fixed seat 60 of the damping mechanism 100, and the driving member 32 of the damping mechanism 100 is rotatably coupled to the intermediate bracket 200. There is a predetermined distance between a rotation axis of the second coupling rod 300 relative to the intermediate bracket 200 and a rotation axis of the driving member 32 relative to the intermediate bracket 200. Thus, as illustrated in FIG. 12, the intermediate bracket 200, the second coupling rod 300, the driving member 32 and the guide part 62 on the fixed seat 60 form a crank-slider mechanism. When the second coupling rod 300 and the driving member 32 both rotate relative to the intermediate bracket 200, because there is the predetermined distance between the rotation axis of the second coupling rod 300 relative to the intermediate bracket 200 and the rotation axis of the driving member 32 relative to the intermediate bracket 200, and the second coupling rod 300 is rotatably coupled to the fixed seat 60, the driving member 32 can slide along the guide part 62 on the fixed seat 60. As mentioned above, when the driving member 32 slides along the guide part 62, the driving member will drive the transmission member 31 to rotate to change the volume of the damping fluid cavity 110. When the volume of the damping fluid cavity 110 changes, the damping fluid can flow between the damping fluid cavity 110 and the outside through the damping fluid circulation port 11. The damping fluid circulation port 11 can limit the flow speed of the damping fluid, thereby providing damping force for opening and closing action of the hinge 900.

In one embodiment, the second coupling rod 300 includes a third rotating coupling part 310 rotatably coupled to the intermediate bracket 200, a fourth rotating coupling part 320 rotatably coupled to the fixed seat 60 of the damping mechanism 100, and a coupling rod part 330 coupling the third rotating coupling part 310 and the fourth rotating coupling part 320. As illustrated in FIG. 10, in a direction of a rotation axis of the third rotating coupling part 310, the third rotating coupling part 310 and the fourth rotating coupling part 320 are staggered, and the third rotating coupling part 310 is closer to the chamber 10 than the fourth rotating coupling part 320. The damping mechanism 100 has a larger size in a direction of the rotation axis of the third rotating coupling part 310, while the fourth rotating coupling part 320 needs to be coupled to the fixed seat 60 and occupy part of space. Based on this, the third rotating coupling part 310 and the fourth rotating coupling part 320 are staggered, which can ensure a transmission torque between the third rotating coupling part 310 and the fourth rotating coupling part 320, and can also make the overall structure of the hinge 900 more compact. In some embodiments, the coupling rod part 330 is configured to be of a bent or curved structure, thereby ensuring structural strength of the second coupling rod 300.

The intermediate bracket 200 is configured to form rotating coupling with the second coupling rod 300 and the driving member 32 separately. In some embodiments, as illustrated in FIG. 11, the intermediate bracket 200 includes a bracket body 210 and a cover 220 snapped with each other. The bracket body 210 and the cover 220 can be fixedly coupled, for example, by snap-fit, fastener coupling, etc. They are snapped to form a sixth rotating coupling part fitted with the second coupling rod 300 and a seventh rotating coupling part fitted with the driving member 32.

In embodiment, as illustrated in FIG. 11, the third rotating coupling part 310 provided at one end of the second coupling rod 300 has a convex arc face and a concave arc face, and the sixth rotating coupling part includes a first cylindrical groove 221 defined in the cover 220 and configured to be fitted with the convex cylindrical face and a cylindrical protrusion (not illustrated in the figure) provided on the bracket body 210 and configured to be fitted with the concave cylindrical face. After the cover 220 is snapped with the bracket body 210, space for rotation of the third rotating coupling part 310 is formed between the first cylindrical groove 221 and the cylindrical protrusion. Of course, in other embodiments, the third rotating coupling part 310 may also be a rotating shaft, and the sixth rotating coupling part is a rotating shaft hole fitted with the rotating shaft.

As still illustrated in FIG. 11, the driving member 32 further includes a fifth rotating coupling part 325 coupled to the driving part 329, and the fifth rotating coupling part 325 is rotatably coupled to the intermediate bracket 200. The fifth rotating coupling part 325 is coupled to the driving part 329 through a bending structure 326. Provision of the bending structure 326 makes the driving part 329 offset to the outside of the intermediate bracket 200, thereby forming more accommodation space inside the driving part 329 when the hinge 900 is folded in. For example, the accommodation space may accommodate a bending area of a foldable screen. In some embodiments, the fifth rotating coupling part 325 includes the first rotating shaft, and the seventh rotating coupling part includes second cylindrical grooves 222 defined in the cover 220 and the bracket body 210. After the cover 220 is snapped with the bracket body 210, space for rotation of the first rotating shaft of the driving member 32 is formed between the two second cylindrical grooves 222. Of course, in other embodiments, the fifth rotating coupling part 325 may also have a bearing bush-like structure similar to the structure of the third rotating coupling part 310, and the cover body 220 and the bracket body 210 may be provided with a corresponding fitting structure.

In one embodiment, as illustrated in FIG. 5, the sixth rotating coupling part includes a coupling rod coupling part 63 provided on the fixed seat 60, the coupling rod coupling part 63 is provided side by side with the chamber 10, and the fourth rotating coupling part 320 is rotatably coupled to the coupling rod coupling part 63. In some embodiments, the fourth rotating coupling part 320 includes a second rotating shaft provided at the other end of the second coupling rod 300, and a third pin hole (not illustrated in the figure) is defined in the second rotating shaft. The coupling rod coupling part 63 defines a fourth pin hole 631, and a pin passes through the third pin hole and the fourth pin hole 631, to realize rotating coupling between the second coupling rod 300 and the fixed seat 60. Of course, in other embodiments, the coupling rod coupling part 63 may be provided with two stub shafts, and the second rotating shaft 320 may be snapped between the two stub shafts, so that the two stub shafts can be respectively snapped into the third pin hole. In this way, two stub shafts can be utilized to support the second rotating shaft 320, and at the same time, rotating coupling between the second coupling rod 300 and the fixed seat 60 can be realized.

Embodiments of the present disclosure further provide a foldable electronic device 1000, which includes a foldable screen 800, such as a flexible OLED (Organic Light-Emitting Diode) screen, and the hinge 900 according to the above various embodiments. The hinge 900 is utilized to realize folding of the foldable screen 800. As the hinge 900 is provided with the damping mechanism 100, damping force can be provided when the foldable screen 800 is switched between a folded state and an unfolded state, so that a hand feeling of the foldable electronic device 1000 during the state switching can be improved, an impact on the internal structure of the foldable electronic device 1000 caused by an excessive stress is avoided, and the service life of the foldable electronic device 1000 is prolonged.

In some embodiments, as illustrated in FIG. 9 to FIG. 11, the foldable electronic device 1000 includes a first middle frame 400 and a second middle frame 500, and the fixed seats 60 on both sides of the intermediate bracket 200 of the hinge 900 are fixedly coupled to the first middle frame 400 and the second middle frame 500 respectively. For example, the fixed seats 60 may be fixedly coupled to the first middle frame 400 and the second middle frame 500 by welding, screw coupling and the like. When the foldable electronic device 1000 is in the unfolded state, the transmission member 31 is at the first rotation position. When the foldable electronic device 1000 is changed from the unfolded state to the folded state, the first middle frame 400 and the second middle frame 500 respectively drive the fixed seats 60 on both sides to rotate relatively, so that the driving member 32 slides relative to the guide part 62 on the fixed seat 60, thereby driving the transmission member 31 to rotate to the second rotation position. The movable blocking member 20 in contact with the transmission member 31 will compress the damping fluid cavity 110, and the volume change of the damping fluid cavity 110 will provide damping force to rotation of the first middle frame 400 and the second middle frame 500, to improve the hand feeling of the foldable electronic device 1000 during folding.

On the contrary, when the foldable electronic device 1000 is unfolded, the first middle frame 400 and the second middle frame 500 respectively drive the fixed seats 60 on both sides to rotate in opposite directions, so that the driving member 32 slides reversely relative to the guide part 62 on the fixed seat 60, thereby driving the transmission member 31 to rotate to the first rotation position. The movable blocking member 20 can move reversely under the action of the transmission member 31 or the elastic reset member 33 to expand the volume of the damping fluid cavity 110, and the volume change of the damping fluid cavity 110 will provide damping force to rotation of the first middle frame 400 and the second middle frame 500, to improve the hand feeling of the foldable electronic device 1000 during unfolding. In addition, the damping force provided by the damping mechanism 100 can also prevent the impact on the internal structure of the foldable electronic device 1000 caused by the excessive stress when the state changes, thereby prolonging the service life of the foldable electronic device 1000.

In some embodiments, the foldable electronic device 1000 may be a mobile phone, an electronic book and other electronic devices, which is not limited by the present disclosure.

In one embodiment, the first middle frame 400 defines a first mounting groove 410, the second middle frame 500 defines a second mounting groove 510, and the fixed seats 60 of the rotating coupling components 700 on both sides are respectively provided in the first mounting groove 410 and the second mounting groove 510. By providing the first mounting groove 410 and the second mounting groove 510, the fixed seats 60 are offset to the outside of the intermediate bracket 200, so that more accommodation space can be formed inside the fixed seats 60 when the hinge 900 is folded in, and the accommodation space can accommodate the folding area of the foldable screen 800.

One hinge 900 or a plurality of hinges 900 may be provided on the foldable electronic device 1000. In some embodiments, the foldable electronic device 1000 has an up-down foldable structure, and the foldable electronic device 1000 includes one hinge 900. In other embodiments, the foldable electronic device 1000 has a left-right foldable structure, and the foldable electronic device 1000 includes a plurality of hinges 900 provided side by side.

The technical solution provided by the embodiments of the present disclosure may have the following beneficial effects: the damping fluid cavity is formed by enclosure of the movable blocking member and the chamber, and at least one of the chamber and the movable blocking member defines the damping fluid circulation port in communication with the damping fluid cavity. When the power assembly drives the movable blocking member to move to change the volume of the damping fluid cavity, the damping fluid can flow between the damping fluid cavity and the outside through the damping fluid circulation port. The damping fluid circulation port can limit the flow speed of the damping fluid, thereby providing damping force to the movement of the power assembly, so that the power assembly can move smoothly. When the damping mechanism is applied to the hinge of the foldable electronic device, the mechanism can provide damping force when the foldable electronic device is switched in form, effectively improve the hand feeling, and meanwhile can avoid an impact on the structure of the foldable electronic device caused by an excessive stress during form switching, thereby prolonging the service life of the hinge and the foldable electronic device.

Those skilled in the art will easily conceive other embodiments of the present invention after considering the specification and practicing the present invention disclosed herein. The present application is intended to cover any variations, uses or adaptations of the present invention, which follow the general principles of the present invention and include common knowledge or conventional technical means in the technical field that are not disclosed in the present disclosure. The description and embodiments are only deemed to be illustrative. The true scope and spirit of the present invention are indicated by the following claims.

It should be understood that the present invention is not limited to the precise structure described above and illustrated in the drawings, and various modifications and changes can be made without departing from its scope. The scope of the present invention is limited only by the appended claims.

What is claimed is:

1. A damping mechanism, comprising:
    a chamber;
    a movable blocking member, at least part of the movable blocking member being located in the chamber and cooperating with an inner wall face of the chamber to enclose a damping fluid cavity, at least one of the chamber and the movable blocking member defining a damping fluid circulation port in communication with the damping fluid cavity; and
    a power assembly abutted against the movable blocking member and configured to drive the movable blocking member to move relative to the chamber to change volume of the damping fluid cavity,
    wherein the chamber defines at least one opening, the power assembly comprises a transmission member provided with a first rotating coupling part, the transmission member is rotatable around a rotation axis of the first rotating coupling part, and a first end of the transmission member in a rotation direction is coupled to the movable blocking member through the opening;

wherein the first end of the transmission member in the rotation direction is abutted against a first end of the movable blocking member to apply a pressure along a first direction to the movable blocking member; and the power assembly further comprises an elastic reset member provided in the chamber, the elastic reset member is abutted against a second end of the movable blocking member and configured to apply a pressure to the movable blocking member in a second direction opposite the first direction; and wherein the movable blocking member comprises a blocking part and a guide rod part coupled to the blocking part, the blocking part and the guide rod part are both located in the chamber, and the blocking part is hermetically coupled to the chamber; and a junction of the blocking part and the guide rod part is provided with a step face, the first end of the transmission member is abutted against the blocking part, and the elastic reset part is fitted over the guide rod part and abutted against the step face.

2. The damping mechanism according to claim 1, wherein the movable blocking member is slidably fitted in the chamber, and the movable blocking member is slidable along an extending direction of the chamber.

3. The damping mechanism according to claim 2, wherein a circulation area of the damping fluid circulation port is smaller than a cross-sectional area of the damping fluid cavity.

4. The damping mechanism according to claim 1, wherein the damping mechanism further comprises a fixed seat, the fixed seat comprising a fixed seat body defining the chamber, and a second rotating coupling part located at a side of the fixed seat body, wherein the first rotating coupling part is fitted with the second rotating coupling part to rotatably couple the transmission member to the fixed seat.

5. The damping mechanism according to claim 4, wherein the fixed seat is provided with a guide part, and the power assembly further comprises a driving member slidably fitted with the guide part, and the driving member is coupled to a second end of the transmission member in the rotation direction.

6. The damping mechanism according to claim 5, wherein the transmission member has a first rotation position and a second rotation position, and the volume of the damping fluid cavity corresponding to the first rotation position is larger than the volume of the damping fluid cavity corresponding to the second rotation position;

the driving member comprises a driving part; the driving part comprises a first fitting face and a second fitting face coupled at an angle, and the second end of the transmission member in the rotation direction is fitted with the first fitting face and the second fitting face; and when the transmission member is located at the first rotation position, the second end of the transmission member in the rotation direction is fitted with the first fitting face, and when the transmission member is located at the second rotation position, the second end of the transmission member in the rotation direction is fitted with the second fitting face.

7. The damping mechanism according to claim 6, wherein the second end of the transmission member in the rotation direction is provided with one of:
a roller; and
a transition structure fitted with the first fitting face and the second fitting face.

8. The damping mechanism according to claim 5, wherein the transmission member has a first rotation position and a second rotation position, and the volume of the damping fluid cavity corresponding to the first rotation position is larger than the volume of the damping fluid cavity corresponding to the second rotation position; and the driving member comprises a driving part, the driving part is coupled to the transmission member through a first coupling rod to drive the transmission member to rotate between the first rotation position and the second rotation position.

9. The damping mechanism according to claim 5, wherein the openings are defined in both ends of the chamber, each opening is provided with the movable blocking member, and each movable blocking member is correspondingly provided with the transmission member; and two second rotating coupling parts are provided at intervals, and respectively fitted with the first rotating coupling parts of the two transmission members, the guide part is between the two second rotating coupling parts, and the driving member is separately coupled to the second ends of the two transmission members.

10. The damping mechanism according to claim 5, wherein the guide part has a protruded structure extending from the fixed seat body to a side away from the chamber, the protruded structure has an I-shaped cross section, and the protruded structure comprises two limit plate parts and a guide bar located between the two limit plate parts and coupling the two limit plate parts;

the driving part of the driving member defines a guide through slot; and part of the driving part is located between the two limit plate parts, and the guide bar is slidably fitted in the guide through slot.

11. The damping mechanism according to claim 10, wherein the driving part defines a groove matched with the limit plate parts, and the limit plate parts are slidably fitted in the groove.

12. The damping mechanism according to claim 10, wherein two second rotating coupling parts are provided at intervals, and the protruded structure is located at a site selected from the group consisting of:
between the two second rotating coupling parts; and,
at a side of one of the second rotating coupling parts.

13. The damping mechanism according to claim 1, wherein a sealing structure is between the movable blocking member and the inner wall face of the chamber.

14. A hinge, comprising:
an intermediate bracket; and
a rotating coupling component rotatably coupled to the intermediate bracket, the rotating coupling component comprising a damping mechanism, the damping mechanism comprising:
a chamber,
a movable blocking member, at least part of the movable blocking member being located in the chamber and cooperating with an inner wall face of the chamber to enclose a damping fluid cavity, at least one of the chamber and the movable blocking member defining a damping fluid circulation port in communication with the damping fluid cavity, and
a power assembly abutted against the movable blocking member and configured to drive the movable blocking member to move relative to the chamber to change volume of the damping fluid cavity,
wherein the chamber defines at least one opening, the power assembly comprises a transmission member provided with a first rotating coupling part, the transmission member is rotatable around a rotation axis of the first rotating coupling part, and a first end of the transmission member in a rotation direction is coupled to the movable blocking member through the opening;

wherein the first end of the transmission member in the rotation direction is abutted against a first end of the movable blocking member to apply a pressure along a first direction to the movable blocking member; and the power assembly further comprises an elastic reset member provided in the chamber, the elastic reset member is abutted against a second end of the movable blocking member and configured to apply a pressure to the movable blocking member in a second direction opposite the first direction;

wherein the movable blocking member comprises a blocking part and a guide rod part coupled to the blocking part, the blocking part and the guide rod part are both located in the chamber, and the blocking part is hermetically coupled to the chamber; and a junction of the blocking part and the guide rod part is provided with a step face, the first end of the transmission member is abutted against the blocking part, and the elastic reset part is fitted over the guide rod part and abutted against the step face; and wherein the damping mechanism is configured to provide damping force for rotation of the rotating coupling component relative to the intermediate bracket.

15. The hinge according to claim 14, wherein the rotating coupling component comprises a second coupling rod, the second coupling rod comprises a third rotating coupling part rotatably coupled to the intermediate bracket, a fourth rotating coupling part rotatably coupled to the fixed seat of the damping mechanism, and a coupling rod part coupling the third rotating coupling part and the fourth rotating coupling part; and in a rotation axis direction of the third rotating coupling part, the third rotating coupling part and the fourth rotating coupling part are staggered, and the third rotating coupling part is closer to the chamber than the fourth rotating coupling part.

16. The hinge according to claim 15, wherein the coupling rod part is configured to be of a bent or curved structure.

17. A foldable electronic device, comprising:
a foldable screen; and
at least one hinge configured to realize folding of the foldable screen and comprising:
an intermediate bracket; and
a rotating coupling component rotatably coupled to the intermediate bracket, the rotating coupling component comprising a damping mechanism, the damping mechanism comprising:
a chamber,
a movable blocking member, at least part of the movable blocking member being located in the chamber and cooperating with an inner wall face of the chamber to enclose a damping fluid cavity, at least one of the chamber and the movable blocking member defining a damping fluid circulation port in communication with the damping fluid cavity, and
a power assembly abutted against the movable blocking member and configured to drive the movable blocking member to move relative to the chamber to change volume of the damping fluid cavity,
wherein the damping mechanism is configured to provide damping force for rotation of the rotating coupling component relative to the intermediate bracket.

* * * * *